United States Patent
Weiss et al.

(10) Patent No.: US 7,328,683 B2
(45) Date of Patent: Feb. 12, 2008

(54) METHOD AND DEVICE FOR CONTROLLING THE TRANSITION IN A DIRECT INJECTION INTERNAL COMBUSTION ENGINE

(75) Inventors: Frank Weiss, Pentling/Grasslfing (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/570,919

(22) PCT Filed: Sep. 3, 2004

(86) PCT No.: PCT/EP2004/052023

§ 371 (c)(1),
(2), (4) Date: Nov. 14, 2006

(87) PCT Pub. No.: WO2005/024213

PCT Pub. Date: Mar. 17, 2005

(65) Prior Publication Data

US 2007/0055436 A1  Mar. 8, 2007

(30) Foreign Application Priority Data

Sep. 5, 2003  (DE) ................................ 103 41 070

(51) Int. Cl.
- *F02D 41/30* (2006.01)
- *F02D 41/40* (2006.01)
- *F02D 37/02* (2006.01)

(52) U.S. Cl. ................. 123/299; 123/90.15; 123/90.17; 123/295; 123/406.47

(58) Field of Classification Search ............. 123/90.11, 123/90.15–90.17, 295, 299, 346, 406.47
See application file for complete search history.

(56) References Cited

U.S. PATENT DOCUMENTS

| | | | |
|---|---|---|---|
| 5,168,851 A | 12/1992 | Itoyama | |
| 6,561,158 B2 | 5/2003 | Yoshida et al. | |
| 6,581,564 B2 * | 6/2003 | Ogawa et al. | 123/295 |
| 7,240,664 B2 * | 7/2007 | Yoshida et al. | 123/346 |
| 2006/0196466 A1 * | 9/2006 | Kuo et al. | 123/295 |

FOREIGN PATENT DOCUMENTS

| | | |
|---|---|---|
| DE | 101 46 504 A1 | 5/2002 |
| DE | 102 42 115 A1 | 7/2003 |
| DE | 103 34 401 B3 | 11/2004 |
| EP | 0 889 218 A2 | 1/1999 |
| EP | 1 081 364 A2 | 3/2001 |
| JP | 08240119 A | 9/1996 |
| WO | WO 03/052253 A2 | 6/2003 |
| WO | WO 2004/055351 A1 | 7/2004 |
| WO | WO 2005/012712 A1 | 2/2005 |

\* cited by examiner

*Primary Examiner*—T. M Argenbright

(57) ABSTRACT

During the changeover from a first operating mode of a spark-ignition engine with direct fuel injection to a second operating mode, in particular between a homogeneous stoichiometric and homogeneous lean, stratified or HCCI operation with changeovers of the valve stroke or the valve phase, there is the risk of an undesired torque jump, which can lead to a perceptible jolting of the vehicle or to a disturbance in the running of the spark-ignition engine. The invention thus proposes, in particular in the case of an inadmissibly large torque jump, the initiation of a multiple injection of fuel in addition to the conventional compensation by the displacement of the ignition angle. A partial quantity of said fuel is injected during the compression phase to reduce the degree of efficiency, thus reducing the torque produced.

15 Claims, 3 Drawing Sheets

METHOD AND DEVICE FOR CONTROLLING THE TRANSITION IN A DIRECT INJECTION INTERNAL COMBUSTION ENGINE

CROSS REFERENCE TO RELATED APPLICATIONS

This application is the US National Stage of International Application No. PCT/EP2004/052023, filed Sep. 3, 2004 and claims the benefit thereof. The International Application claims the benefits of German application No. 10341070.8 filed Sep. 5, 2003. All applications are incorporated by reference herein in their entirety.

FIELD OF THE INVENTION

The invention concerns a method or a device, as applicable, in accordance with the accompanying claims, by which it is possible to control the transition from a first mode of operation of an internal combustion engine operating with direct injection of the fuel to a second mode of operation, for example between a homogeneous stoichiometric and a homogeneous lean stratified or HCCI mode (homogeneous charged compression ignition), switchovers of the valve lift or the valve phase.

BACKGROUND OF THE INVENTION

It is already known that a step-change in torque generally occurs when switching over between two modes of operation, and that depending on the mode of operation this can be impermissibly large. The reason for this step-change in torque is evidently that the magnitudes of the air masses inducted into the cylinders of the internal combustion engine differ for the different modes of operation, generating torques with a corresponding magnitude. The step-change in torque can lead to irregular running of the internal combustion engine, which makes itself evident in driving use in undesirable ways, for example as juddering.

In the case of small step-changes in the air masses it has been possible, until now, to compensate for them by resetting of the ignition angle. This involves retarding the ignition angle far enough to ensure reliable combustion of the fuel-air mixture. However, the late combustion of the fuel-air mixture effects a reduction in the torque. With a large step-change in the air mass, the situation could arise in which a resetting of the ignition angle alone is no longer sufficient to compensate for the step-change in torque. To avoid undesirable juddering of the vehicle occurring in this case, the switchover to the second mode of operation is generally inhibited, or the engine is so arranged that no large step-change can occur in the air mass. The price for this is a correspondingly higher fuel consumption.

SUMMARY OF THE INVENTION

The object underlying the invention is to propose a method or a device, as applicable, with which a significantly larger reduction in the step-change in the torque can be achieved. This object is achieved by the characteristics of the accompanying claims.

In the case of the method in accordance with the invention or the device for controlling the transition between two modes of operation, as applicable, with the characterizing features of the accompanying claims, there is the advantage that even a large step-change in the torque can still be successfully reduced, without detriment to the combustion of the fuel-air mixture. This is achieved by split injection, by which at least a portion of the fuel which is to be injected is injected into the cylinder or cylinders of the internal combustion engine during the compression phase. Injection during the compression phase results in three main effects which support a reduction in the torque: The reduced internal cooling in the cylinder results in a reduction in the mass of the air inducted, because a portion of the fuel load injected is injected at a point in time when the cylinder's valve is already closed (compression phase). In addition, there is the advantage that the combustion is made more inefficient, because when the injected fuel is injected late the swirling is less marked. Finally, measurements have also shown it is advantageous in that the smoothness of running of the internal combustion engine is unchanged if the ignition angle is retarded even more with injection during the compression phase. By retarding the ignition angle, a further reduction in the torque can be achieved. It is seen as particularly advantageous that the invention achieves a significantly greater reduction of the step-change in the torque without detriment to the smoothness of running of the internal combustion engine.

The measures itemized in the subclaims are advantageous developments of and improvements to the method and device specified respectively in the accompanying claims. An alternative solution seen as particularly advantageous is that during the switchover phase the fuel load to be injected is injected entirely within the compression phase. As a result, the fuel makes no contribution to the cooling of the air mass which is in the cylinder, so that during the switchover phase the air mass is relatively small and therefore a relatively small torque is generated.

During the compression phase the valves of the cylinder are closed, so that the fuel injected into the cylinder cannot be so strongly swirled as it could if the injection valve were open. For the purpose of further reducing the torque it is therefore sufficient in many cases to inject only a portion of the fuel.

A further reduction in the torque is achieved if the ignition angle is set continuously retarded during the switchover phase. Because the later the fuel-air mixture is ignited the smaller is the resulting torque.

It is also seen as a good solution if, after the switchover, normal operation of the standard injection for the mode of operation concerned is resumed as soon as torque smoothing is completed. For example, if a switchover has been made to operation with a small valve lift it is then possible to set the control of the air mass, the fuel load and the ignition angle to the values specific to this mode of operation. This has no negative effect on the smoothness of running of the internal combustion engine, so that this switchover operation is imperceptible even to the occupants of the vehicle.

A preferred advantageous application results if, for a discrete switchover of the valve lift, the difference in the valve lift can be amplified. A different valve lift produces a difference in the level to which the cylinder is charged, and thereby also a torque of a correspondingly different magnitude. Since a high cylinder charge is inevitably also linked with an increased fuel consumption it is possible, in particular in partial-load conditions when the maximum power of the engine is not required, to switch over to a smaller valve lift with a correspondingly lower fuel consumption.

It is further advantageous, when switching over to operation with a small valve lift, to first open the throttle valve, to retard the ignition angle back to a permissible minimum value and, if necessary, to activate split injection in the compression phase. This is the most reliable way of compensating for a step-change in torque.

If the switchover has been successful, the injection can then be reset to the standard values.

In the case of the device for controlling the transition between two modes of operation, it is considered particularly advantageous if, for controlling the switchover, use is made of a program, that using an algorithm an adjustment device on the internal combustion engine can be controlled in such a way that the fuel injection takes place in the compression phase. In particular, the program can control adjustment devices for the throttle valve, the ignition angle setting and/or the fuel injection.

BRIEF DESCRIPTION OF THE DRAWINGS

An exemplary embodiment of the invention is shown in the drawing, and is explained in more detail in the following description.

DETAILED DESCRIPTION OF THE INVENTION

Figure 1:
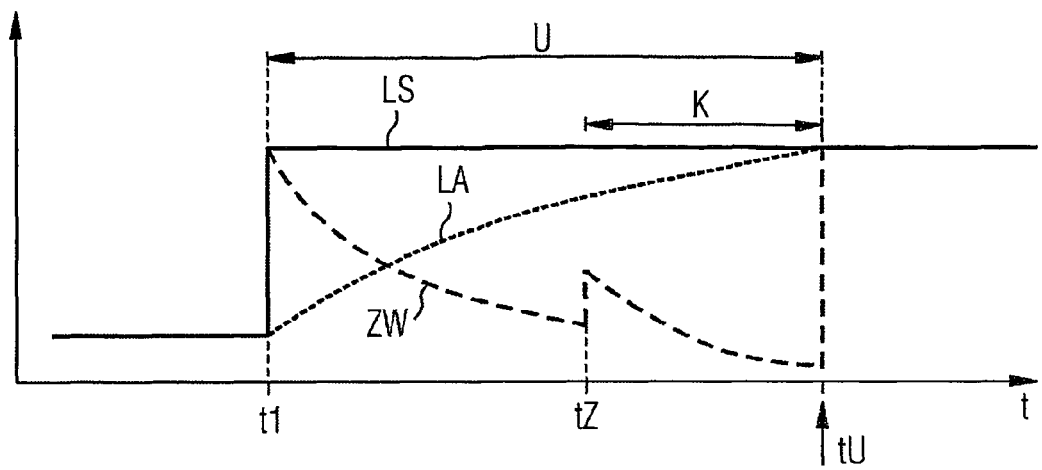
FIG. 1 shows an exemplary embodiment of the invention with a diagram, in which a switchover is made from operation with a large valve lift to operation with a small valve lift.

The way in which the switchover between two modes of operation functions will be explained in more detail for an exemplary embodiment in accordance with the invention, as shown in FIG. 1, by reference to a diagram. By way of example, it is assumed that an internal combustion engine operated using fuel direct injection is to be switched over from operation with a large valve lift on the inlet and/or the exhaust valves to operation with a small valve lift. On the one hand this switchover will result in the torque generated being less, and on the other hand this mode of operation is more fuel-saving, so that under certain operating conditions, for example under partial load when the maximum torque is not demanded of the engine, a fuel-saving mode of operation with the small valve lift appears advantageous. As a result of the switchover to operation with a small valve lift, it is no longer possible for as much air to flow into the cylinders of the internal combustion engine as before, when operating with a large valve lift, so that the torque is thereby reduced. There are various known methods for switching over the valve lift, so it is not necessary to explain these methods in more detail. For example, the switchover can be effected mechanically by an axial movement of the camshafts. In this case, the camshafts are fitted with cams of different heights, by which the valve tappets are actuated. Alternatively, the cups of the tappets can be raised hydraulically, thus affecting the valve lift.

The switchover is effected automatically, and should be imperceptible to the driver or occupants of the vehicle, so that there is no detrimental effect on the ride comfort. However, if the full torque of the engine is required at a later point in time then there is an automatic switch back to operation with a large valve lift again.

In the diagram in FIG. 1, the time t is plotted along the x-axis. Plotted against the Y-axis are the amplitudes of each of the three different curves. The continuous curve is to represent a prescribed air mass setpoint LS, required for the two operating modes with a large valve lift or a small valve lift, as applicable. This air mass setpoint LS can be set using the throttle valve on the combustion engine. The dotted curve LA reflects the current value of the air masses, which the presettings result in for the cylinder concerned of the combustion engine. The curve shown as a dashed line corresponds to the ignition angle ZW, which is prescribed by an appropriate control device.

In the left-hand part of the diagram in FIG. 1, the engine is still operating with a large valve lift. The throttle valve is relatively far closed, so that the air mass setpoint LS is at a low level (lower left segment of the curve LS). The switchover phase to the small valve lift starts at time t1, from where the curve LS rises vertically, and has been completed by the right-hand part of the diagram. For the purpose of switching over to the small valve lift, the air mass setpoint must first be raised (vertical rise in the curve LS), so that the torque can be held constant during the switchover. For this purpose, the throttle valve is opened at the point in time t1, so that the current air mass in the engine's cylinder increases, as shown by the curve LA. When the curve LA reaches the air mass setpoint LS, it is then possible to switch over to operating with a small valve lift. This latest switchover time point is labeled tU.

Preferably simultaneously with the switchover of the throttle valve, the ignition angle will be retarded from early to a minimal late value, which is reached at time tZ, as shown by the curve ZW. The fuel-air mixture which is present in the cylinder is still combustible at this ignition angle ZW.

In accordance with the invention, provision is made for performing split fuel injection. At the point in time tZ and with the minimum ignition angle, split fuel injection is started. This results in a deterioration in the induction in the air infeed, leading to an increase in the ignition angle (towards early). After this, the ignition angle can be retarded, back to an even lower angle for the split fuel injection, so that the curve ZW drops back again. The switchover to operation with a small valve lift must actually be effected at the latest when the ignition angle is minimal, at the point in time tU. After the switchover to operation with a small valve lift, the air mass in the cylinders is large enough to trigger no step-change in the torque. For this mode of operation, the standard values for the ignition, air mass and injection now apply.

The split injection is preferably carried out in the compression phase K, when the inlet and exhaust valves of the cylinder are closed. The injection during the compression phase K is carried out between the two time markers tZ and tU. The complete switchover phase U between the two time points t1 and tU is indicated by the arrow U.

Provision is made that, in the compression phase when the valves are closed, the fuel load which is to be injected is measured out as partial amounts. Alternatively, it is also possible for the entire fuel load to be injected in the compression phase.

Figure 2:
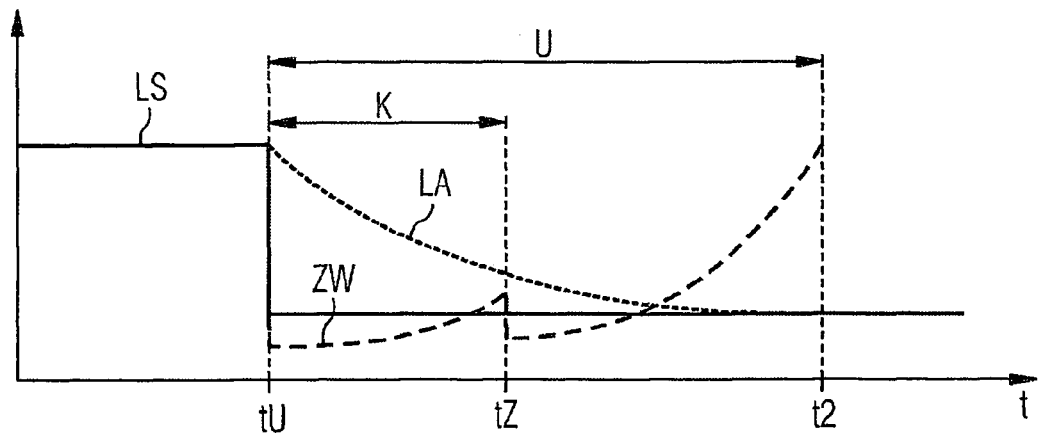
FIG. 2 shows a second diagram of the invention in which a switchover is made from operation with a small valve lift to operation with a large valve lift.

The diagram in FIG. 2 shows the case of a switchover from operation with a small valve lift to operation with a large valve lift. The switchover proceeds in the reverse manner to that previously explained for FIG. 1. In the left-hand part of FIG. 2, the engine is in the small valve lift mode of operation, i.e. the throttle valve is relatively wide open, so that the curve LS for the air mass setpoint has a large amplitude. The ignition is set to an early point. The switchover of the valve lift takes place at the point in time tU, initially with a change in the injection so that at least a portion of the fuel load to be injected is fed in the compression phase K. Simultaneously, closure of the throttle valve is started, i.e. a smaller air mass setpoint is prescribed, as shown by the curve LS. The current air mass value (curve LA) adjusts over time t to the prescribed lower air mass setpoint LS. Because of the valve lift switchover, the ignition angle is retarded at the point in time tU, as shown by the curve ZW. After this, the ignition angle is reset to an early point, appropriate for the reducing air mass. In the course of this, the ignition angle can be retarded again at the point in time tZ, in order to increase it again for the standard injection. At the point in time t2, the ignition angle is at its base value, and the switchover is then complete. The arrow K shows the compression phase. The subsequent control of injection, air mass and ignition angle after the switchover is then carried out in accordance with the standard program.

In a further embodiment of the invention, provision is made for performing the switchover in a corresponding manner between two other modes of operation, for example homogeneous stoichiometric, homogeneous lean stratified or HCCI operation. It is also possible to control different valve phases in this way.

Figure 3:
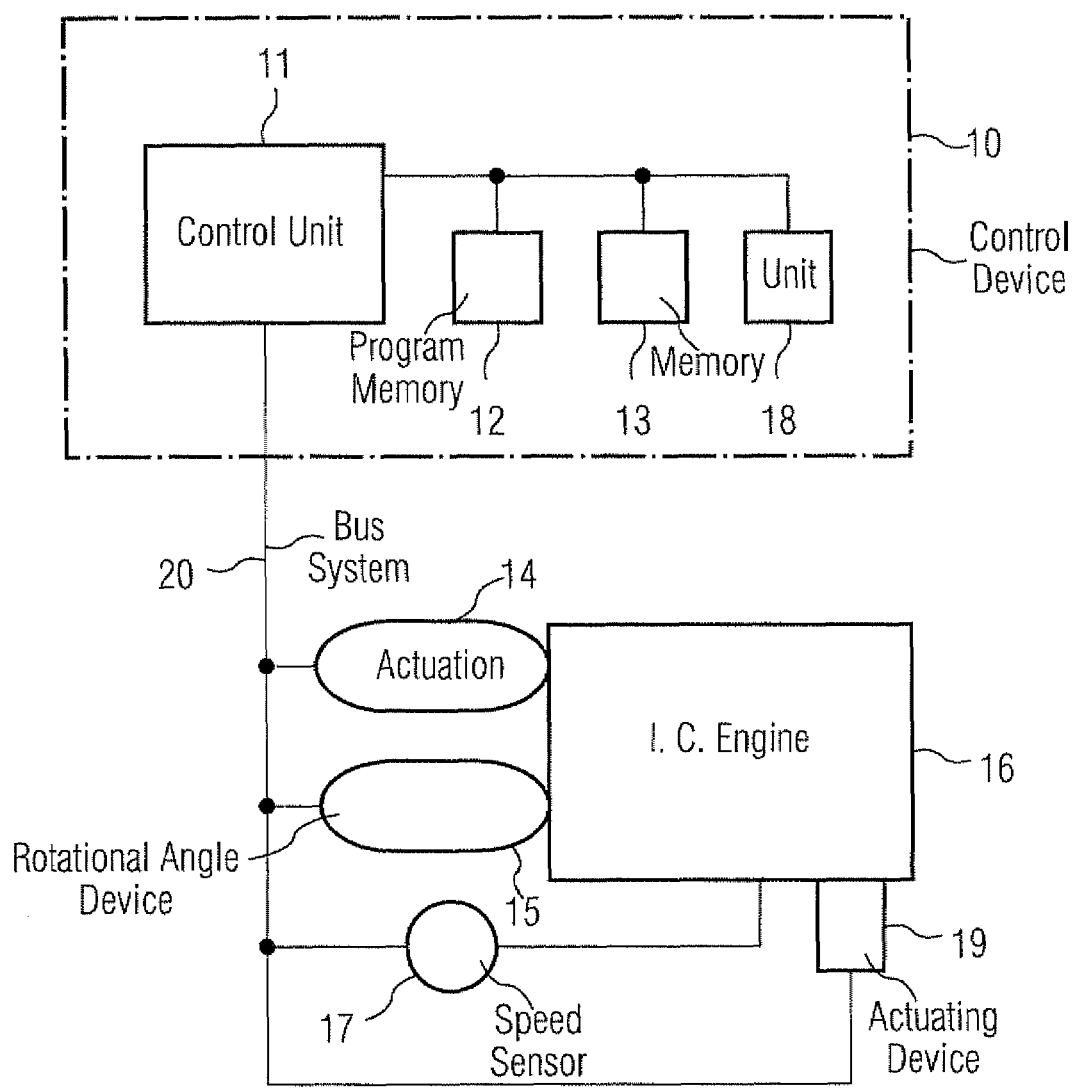
FIG. 3 shows a schematic illustration of a block diagram.

FIG. 3 shows a schematic representation of a device (control device) 10 for controlling the transition between two modes of operation, for example between operation with a large valve lift and operation with a small valve lift. The device 10 will preferably take the form of a part of an engine management system which, with the help of a software program (program with program memory 12), controls the engine functions during the transition between the two modes of operation. This program is executed each time there is a switchover to the other mode of operation. In addition, the device 10 has a memory 13 in which are stored an algorithm for the switchover of the two modes of operation together with further data such as prescribed operational settings, limit values, etc., preferably in tabular form. The device 10 is connected, preferably via a bus system 20, with an actuator 14 for the throttle valve on the internal combustion engine 16. Also connected to the bus system 20 is a device 15 for detecting the rotational angle. It is thereby possible to control the quantity (air mass) of fresh air for the individual cylinders of the internal combustion engine 16 with the help of the actuator 14, and the ignition angle with the help of the device for detecting the rotational angle 15. Also provided is a revolution speed sensor 17 which supplies, to a unit 18 on the device 10, signals from which the engine's current revolutions per minute can be calculated. For example, from the data which is captured it is possible, with the help of a torque model, to determine for each operating state of the internal combustion engine 16 the corresponding torque. From this is then derived a control signal for an actuating device 19, by which the switchover in the valve lifts can be controlled.

Figure 4:
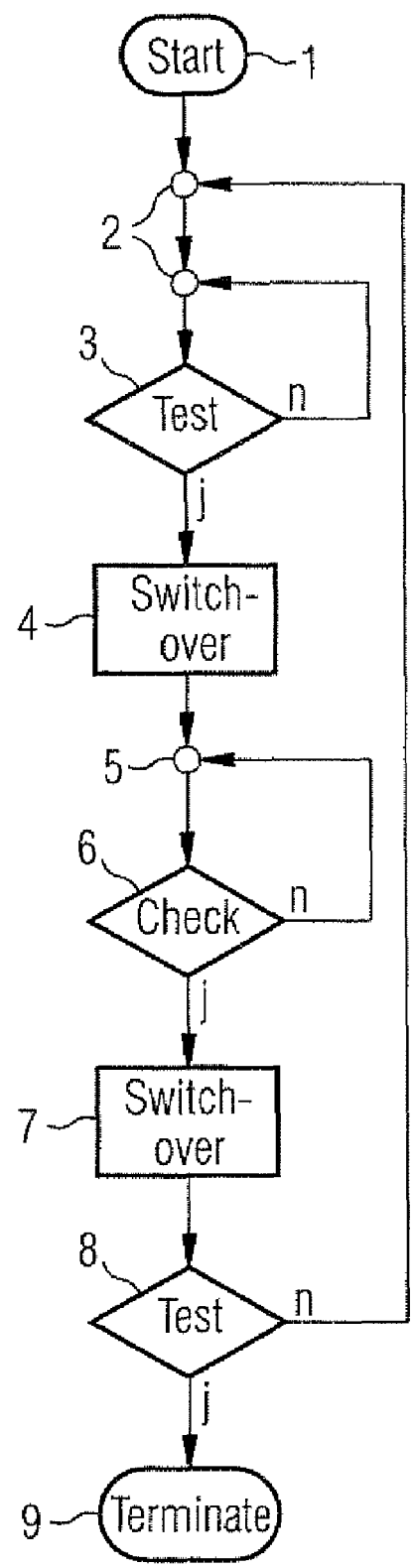
FIG. 4 shows a flow diagram for the control of the modes of operation.

FIG. 4 shows a flow diagram of how the switchover phase for the two modes of operation can proceed with the help of the software program which is installed in the program memory 12 of the control device 10. The program shows, by way of example, the switchover from operation with a large valve lift to operation with a small valve lift, as explained above for FIG. 1. A switch back, or a switchover between two other modes of operation, proceeds in an analogous way.

As shown in FIG. 4, at the point labeled 1 the program starts the switchover in operating mode, after the device 11 has detected or received a signal to initial the switchover phase. Thereupon, the throttle valve is first opened and the ignition angle iteratively retarded, and at the point labeled 3 a check is made as to whether the current ignition angle has fallen below a prescribed minimum first limit value. If not (i.e. 'n'), then the program jumps back to the point labeled 2, and the ignition angle is further retarded.

When the current ignition angle eventually becomes less than the prescribed first limit value, at 'j' (yes), then at the point labeled 4 a switchover of the fuel injection to the compression phase of the internal combustion engine 16 is initiated. The injection can be effected either as a single charge injection or alternatively as a split charges. What is critical however is that, as a result of injection during the compression phase of the internal combustion engine, the torque generated drops further than if the only adjustment were to the ignition angle. It is thereby more easily possible to match the torques before and after the switchover, and hence a step-change in the torque can be more reliably avoided.

At the point labeled 6, the question is asked as to whether the setting of the torque is appropriate for a continuation using the standard injection. If not, then at 'n' the program jumps back to the point labeled 5. The ignition is further retarded and at the point labeled 6 a test is again performed as to whether it is now possible to continue using the standard injection.

If the answer is yes (i.e. at 'j') then at the point labeled 7 a switchover is made to the standard injection provided for the current mode of operation.

At the point labeled 8, a test is performed on whether the switchover in mode of operation has been successfully completed. If not (i.e. at 'n'), then the program jumps back to the program start at the point labeled 2, and the program starts again, as described above.

In the case of a positive completion of the switchover in operating mode (i.e. at 'j'), the program terminates, at the point labeled 9.

The invention claimed is:

1. A method for controlling the transition of a direct injection internal combustion engine from a first operating mode to a second operating mode, comprising:
   determining an output torque of the engine during the first operating mode; and
   minimizing an output torque step change of the engine during a transition period between the first operating mode and the second operating mode of the engine by:
   increasing an air inlet throttle valve opening,
   retarding an ignition angle to a predetermined minimum value,
   partially dividing a total quantity of fuel to be directly injected into a cylinder of the engine into a first and second injection portion, and
   injecting the first injection portion during a compression phase of the engine operation cycle,
   reducing the valve lift of the internal combustion engine to achieve the second operating mode of the engine.

2. The method as claimed in claim 1, wherein the first and second injection portions are injected during the compression phase.

3. The method as claimed in claim 2, wherein the total quantity of fuel to be injected is injected when an inlet valve is closed.

4. The method as claimed in claim 3, wherein the ignition angle is continuously retarded.

5. The method as claimed in claim 4, wherein a larger valve lift can be specified for a discrete valve lift switchover.

6. The method as claimed in claim 5, wherein a standard fuel injection setting is applied after the change-over transition period.

7. The method as claimed in claim 6, wherein the engine operation is returned to a normal mode after the change-over transition has been accomplished.

8. A method for controlling the change-over transition of a direct injection internal combustion engine from a first operating mode to a second operating mode, comprising:
   determining an output torque of the engine during the first operating mode where the first operating mode utilizes a higher valve lift cam profile then the second operating mode; and
   minimizing an output torque step change of the engine during a change-over transition period between the first operating mode and the second operating mode of the engine by:
      setting an air inlet throttle valve opening to a predetermined opening position where the opening position is determined to minimize the output torque step change between the first and second operating modes,
      retarding an ignition angle to a predetermined minimum value where the minimum value is determined to maintain stable fuel combustion and minimize the output torque step change between the first and second operating modes,
      partially dividing a total quantity of fuel to be directly injected into a cylinder of the engine into a first and second injection portion, and
      injecting the first injection portion during a compression phase of the engine operation cycle,
   reducing the valve lift of the internal combustion engine to achieve the second operating mode of the engine.

9. The method as claimed in claim 8, wherein the first and second injection portions are injected during the compression phase.

10. The method as claimed in claim 8, wherein the total quantity of fuel to be injected is injected when an inlet valve is closed.

11. The method as claimed in claim 8, wherein the ignition angle is continuously adjusted.

12. The method as claimed in claim 8, wherein a larger valve lift can be specified for a discrete valve lift switchover.

13. The method as claimed in claim 8, wherein a standard fuel injection setting is applied after the change-over transition period.

14. The method as claimed in claim 8, wherein the engine operation is returned to a normal mode after the change-over transition has been accomplished.

15. A method for controlling the change-over transition of a direct injection internal combustion engine from a first operating mode to a second operating mode, comprising:
   determining an output torque of the engine during the first operating mode where the first operating mode utilizes a lower valve lift cam profile then the second operating mode; and
   minimizing an output torque step change of the engine during a change-over transition period between the first operating mode and a second operating mode of the engine by:
      setting an air inlet throttle valve opening to a predetermined opening position where the opening value is determined to minimize the output torque step change between the first and second operating modes,
      retarding an ignition angle to a predetermined minimum value where the minimum value is determined to maintain stable fuel combustion and minimize the output torque step change between the first and second operating modes,
      partially dividing a total quantity of fuel to be directly injected into a cylinder of the engine into a first and second injection portion, and
      injecting the first injection portion during a compression phase of the engine operation cycle,
   increasing the valve lift of the internal combustion engine to achieve the second operating mode of the engine.

* * * * *